United States Patent
Yan et al.

(10) Patent No.: US 11,432,322 B2
(45) Date of Patent: Aug. 30, 2022

(54) RESOURCE CONFIGURATION PRIORITY LEVELS

(71) Applicant: Motorola Mobility LLC, Chicago, IL (US)

(72) Inventors: Zhi Yan, Beijing (CN); Wei Ling, Beijing (CN); Chenxi Zhu, Beijing (CN); Xiaodong Yu, Beijing (CN); Haipeng Lei, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 193 days.

(21) Appl. No.: 16/480,898

(22) PCT Filed: Jan. 26, 2017

(86) PCT No.: PCT/CN2017/072754
§ 371 (c)(1),
(2) Date: Jul. 25, 2019

(87) PCT Pub. No.: WO2018/137245
PCT Pub. Date: Aug. 2, 2018

(65) Prior Publication Data
US 2020/0015266 A1    Jan. 9, 2020

(51) Int. Cl.
*H04W 74/00*    (2009.01)
*H04W 74/08*    (2009.01)

(52) U.S. Cl.
CPC ..... *H04W 74/008* (2013.01); *H04W 74/0833* (2013.01)

(58) Field of Classification Search
CPC .............................. H04W 74/08; H04W 74/00
See application file for complete search history.

(56) References Cited

U.S. PATENT DOCUMENTS

2013/0242730 A1*  9/2013  Pelletier ................ H04L 1/0046
                                                          370/230
2014/0321389 A1* 10/2014  Zhang ............... H04W 74/0841
                                                          370/329

(Continued)

FOREIGN PATENT DOCUMENTS

CN          101142831 A       3/2008
CN          103370961 A      10/2013

(Continued)

OTHER PUBLICATIONS

Xinsheng Zhao et al., "An Access Priority Level Based Random Access Scheme for QoS Guarantee in TD-LTE-A System", IEEE Xplore digital Library, 2014 IEEE 80th Vehicular Technology Conference, Sep. 14-17, 2014, p. 1-2.

(Continued)

*Primary Examiner* — Sulaiman Nooristany
(74) *Attorney, Agent, or Firm* — Kunzler Bean & Adamson

(57) ABSTRACT

Apparatuses, methods, and systems are disclosed for resource configuration priority levels. One apparatus (200) includes a receiver (212) that receives (602) random access resource information indicating multiple random access resource configurations having different priority levels. The apparatus (200) also includes a processor (202) that determines (604) a random access resource configuration from the multiple random access resource configurations. The apparatus (200) includes a transmitter (210) that transmits (606) a random access signal based on the random access resource configuration.

12 Claims, 7 Drawing Sheets

(56) References Cited

U.S. PATENT DOCUMENTS

| | | | |
|---|---|---|---|
| 2017/0273115 A1* | 9/2017 | Zhou | H04L 5/0053 |
| 2018/0049164 A1* | 2/2018 | Wu | H04W 72/12 |
| 2018/0220465 A1* | 8/2018 | Zhang | H04W 72/042 |
| 2018/0332621 A1* | 11/2018 | Eriksson | H04W 72/0406 |

FOREIGN PATENT DOCUMENTS

| | | |
|---|---|---|
| CN | 103763784 A | 4/2014 |
| WO | 2015126288 A1 | 8/2015 |
| WO | 2016137372 A1 | 9/2016 |

OTHER PUBLICATIONS

PCT/CN2017/072754, "International Search Report", Patent Cooperation Treaty, Sep. 27, 2017, pp. 1-3.

PCT/CN2017/072754, "Written Opinion of the International Searching Authority", Patent Cooperation Treaty, Sep. 27, 2017, pp. 1-3.

\* cited by examiner

RESOURCE CONFIGURATION PRIORITY LEVELS

FIELD

The subject matter disclosed herein relates generally to wireless communications and more particularly relates to resource configuration priority levels.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Massive MTC ("mMTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Narrowband PDCCH ("NPDCCH"), Narrowband PDSCH ("NPDSCH"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PDCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Block ("RB"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, UEs may perform a random access ("RA") procedure to obtain a new connection to the network. In various systems, there may be contention-based RA and non-contention-based RA. The RA procedure may include the exchange of four different messages between a UE and an eNB. A first message ("MSG 1") may include a randomly selected preamble sent in an available resource according to an SIB2 configuration. The eNB may reply with a random access response ("RAR"), denoted as ("MSG 2"), to all detected preambles. If MSG 2 is received by a UE, it may include uplink grant information, pointing to a RB where a connection request ("MSG 3") may be sent. Upon reception of a connection request, the eNB may transmit a contention resolution message as an answer to MSG 3.

In certain configurations, before initiating the RA procedure, UEs may determine a set of PRACH resources and preambles through system information (e.g., SIB2). The transmission of an RA preamble may be restricted to certain time and frequency resources in a particular PRACH resource. The PRACH resource may be periodically configured.

In some wireless configurations, such as NB-IoT, UEs in extreme coverage for transmission in downlink may use a large number of repetitions. In such configurations, DL gaps may be introduced during repetitions of NPDSCH and NPDCCH. During a DL gap, UEs other than those configured with a gap may receive their NPDSCH and/or NPDCCH. Gap configuration may be provided by SIB signaling. Similar to downlink transmissions, UEs with large number of repetition in a RACH preamble transmission may impact other UEs with a limited number of repetition. If an eNB separately configures different PRACH resources for extreme coverage UEs and normal coverage UEs, PRACH resources may be inefficiently used. In some configurations, such as in contention based PRACH, an eNB may configure all the NB-IoT UEs in the same RACH resource (e.g., time-frequency domain). UEs with a large number of repetitions in a RACH preamble transmission may occupy the RACH resource with a long time period. Other UEs with a limited number of repetitions may have difficulty accessing the network due to interference with a long time period.

Various network configurations may use multiple numerologies. In such configurations, control signaling may be used to indicate information for initiating a RACH procedure. Multiple PRACH resource may be configured to support multiple RACH procedures (e.g., with different preamble subcarrier spacing ("SCS"), different preamble bandwidths, different sequence lengths, etc.). In one example, for lower frequency band range: mMTC may use a 1.25 K SCS preamble and ~15 K SCS data; URLLC may use a 5 K (or 1.25 K) SCS preamble and 60 K (or 15 K) SCS data; and eMBB may use a 1.25 K (or 5 K) SCS preamble and ~15 K (or 60 K) SCS data. If multiple PRACH resources are configured for different service and scenarios in a network, loads may be unbalanced, resources may be underutilized, collisions may occur, and/or performance may be unreliable.

BRIEF SUMMARY

Apparatuses for resource configuration priority levels are disclosed. Methods and systems also perform the functions of the apparatus. In one embodiment, the apparatus includes a receiver that receives random access resource information indicating multiple random access resource configurations having different priority levels. The apparatus also includes a processor that determines a random access resource configuration from the multiple random access resource configurations. The apparatus includes a transmitter that transmits a random access signal based on the random access resource configuration.

In one embodiment, each random access resource configuration of the multiple random access resource configurations includes a random access resource priority level, a preamble sequence set, a subcarrier spacing, a frequency domain interval, a time domain interval, a period, a time offset, a frequency offset, or some combination thereof. In some embodiments, each random access resource configuration of the multiple random access resource configurations includes a random access resource priority level. In various embodiments, each random access resource configuration of the multiple random access resource configurations includes a preamble sequence set. In a further embodiment, the receiver receives the random access resource information in a system information block, a master information block, or some combination thereof.

A method for resource configuration priority levels, in one embodiment, includes receiving random access resource information indicating multiple random access resource configurations having different priority levels. The method also includes determining a random access resource configuration from the multiple random access resource configurations. The method includes transmitting a random access signal based on the random access resource configuration.

In one embodiment, an apparatus includes a transmitter that transmits random access resource information indicating multiple random access resource configurations having different priority levels. In various embodiments, the apparatus includes a receiver that receives a random access signal based on a random access resource configuration of the multiple random access resource configurations.

In one embodiment, each random access resource configuration of the multiple random access resource configurations includes a random access resource priority level, a preamble sequence set, a subcarrier spacing, a frequency domain interval, a time domain interval, a period, a time offset, a frequency offset, or some combination thereof. In some embodiments, each random access resource configuration of the multiple random access resource configurations includes a random access resource priority level. In various embodiments, each random access resource configuration of the multiple random access resource configurations includes a preamble sequence set. In a further embodiment, the transmitter transmits the random access resource information in a system information block, a master information block, or some combination thereof.

A method for resource configuration priority levels, in one embodiment, includes transmitting random access resource information indicating multiple random access resource configurations having different priority levels. The method also includes receiving a random access signal based on a random access resource configuration of the multiple random access resource configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
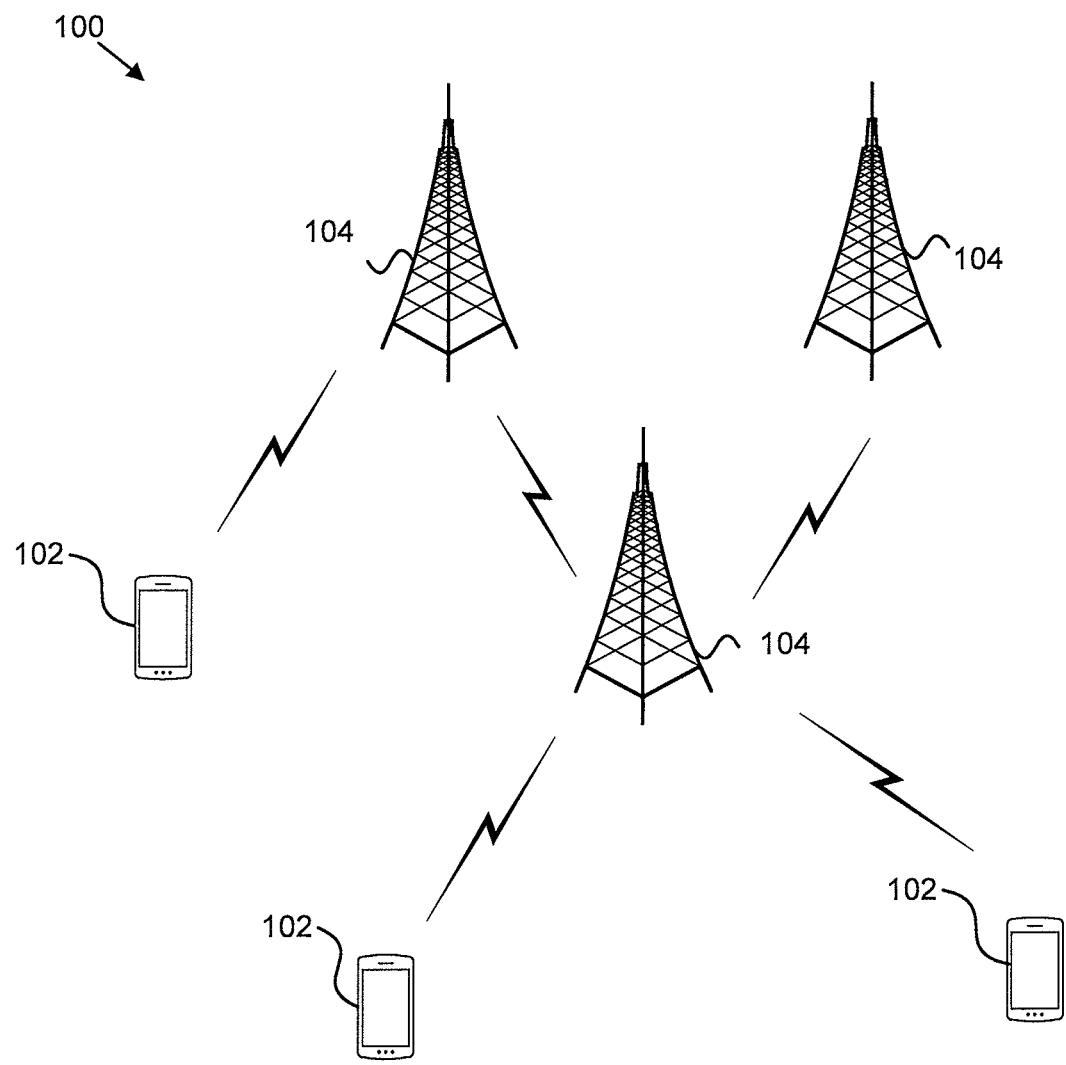
FIG. 1 is a schematic block diagram illustrating one embodiment of a wireless communication system that may use resource configuration priority levels.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 that may use resource configuration priority levels. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may transmit random access resource information indicating multiple random access resource configurations having different priority levels. In certain embodiments, the base unit 104 may receive a random access signal based on a random access resource configuration of the multiple random access resource configurations. Accordingly, a base unit 104 may use resource configuration priority levels.

In another embodiment, a remote unit 102 may receive random access resource information indicating multiple random access resource configurations having different priority levels. The remote unit 102 may determine a random access resource configuration from the multiple random access resource configurations. The remote unit 102 may transmit a random access signal based on the random access resource configuration. Accordingly, a remote unit 102 may use resource configuration priority levels.

Figure 2:
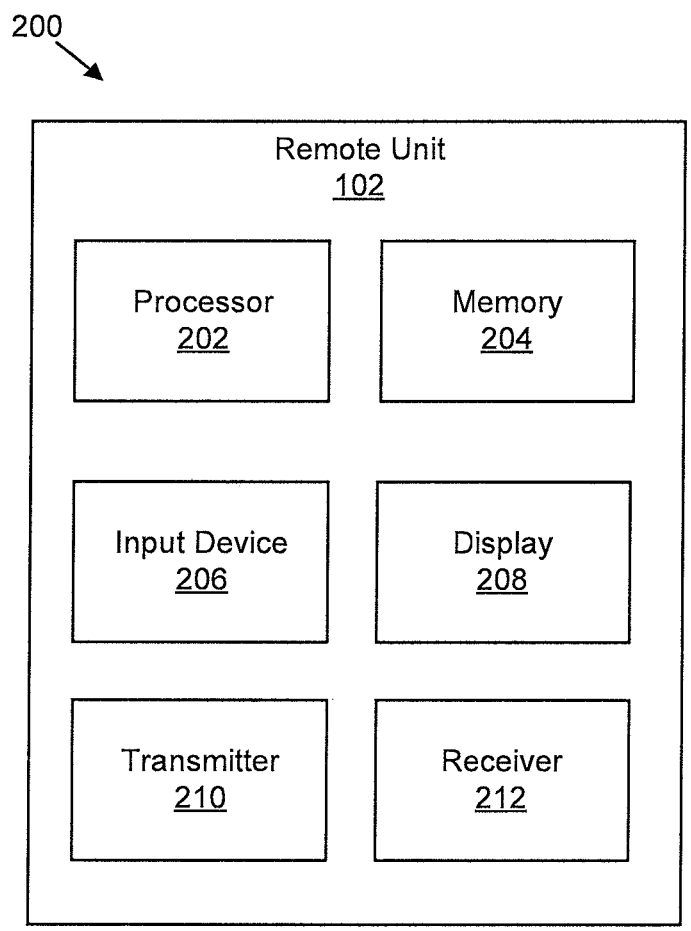
FIG. 2 is a schematic block diagram illustrating one embodiment of an apparatus that may use resource configuration priority levels.

FIG. 2 depicts one embodiment of an apparatus 200 that may use resource configuration priority levels. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine a random access resource configuration from multiple random access resource configurations. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to a random access resource configuration. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 may be used to transmit a random access signal based on a random access resource configuration. In one embodiment, the receiver 212 may be used to receive random access resource information indicating multiple random access resource configurations having different priority levels. In one embodiment, each random access resource configuration of the multiple random access resource configuration may have a corresponding priority level. In some embodiments, the multiple random access resource configurations may include at least one random access resource configuration used for a first priority level and at least one random access resource configuration used for a second priority level different from the first priority level. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
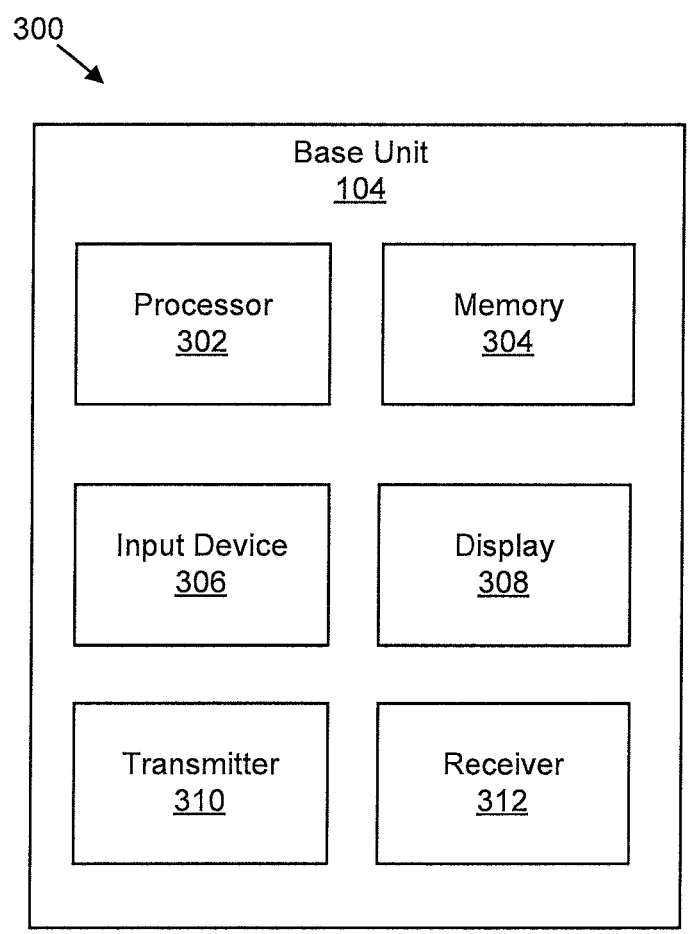
FIG. 3 is a schematic block diagram illustrating one embodiment of an apparatus that may use resource configuration priority levels.

FIG. 3 depicts one embodiment of an apparatus 300 that may use resource configuration priority levels. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may be used to transmit random access resource information indicating multiple random access resource configurations having different priority levels. In one embodiment, each random access resource configuration of the multiple random access resource configuration may have a corresponding priority level. In some embodiments, the multiple random access resource configurations may include at least one random access resource configuration used for a first priority level and at least one random access resource configuration used for a second priority level different from the first priority level. In some embodiments, the receiver 312 may be used to receive a random access signal based on a random access resource configuration of the multiple random access resource configurations. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
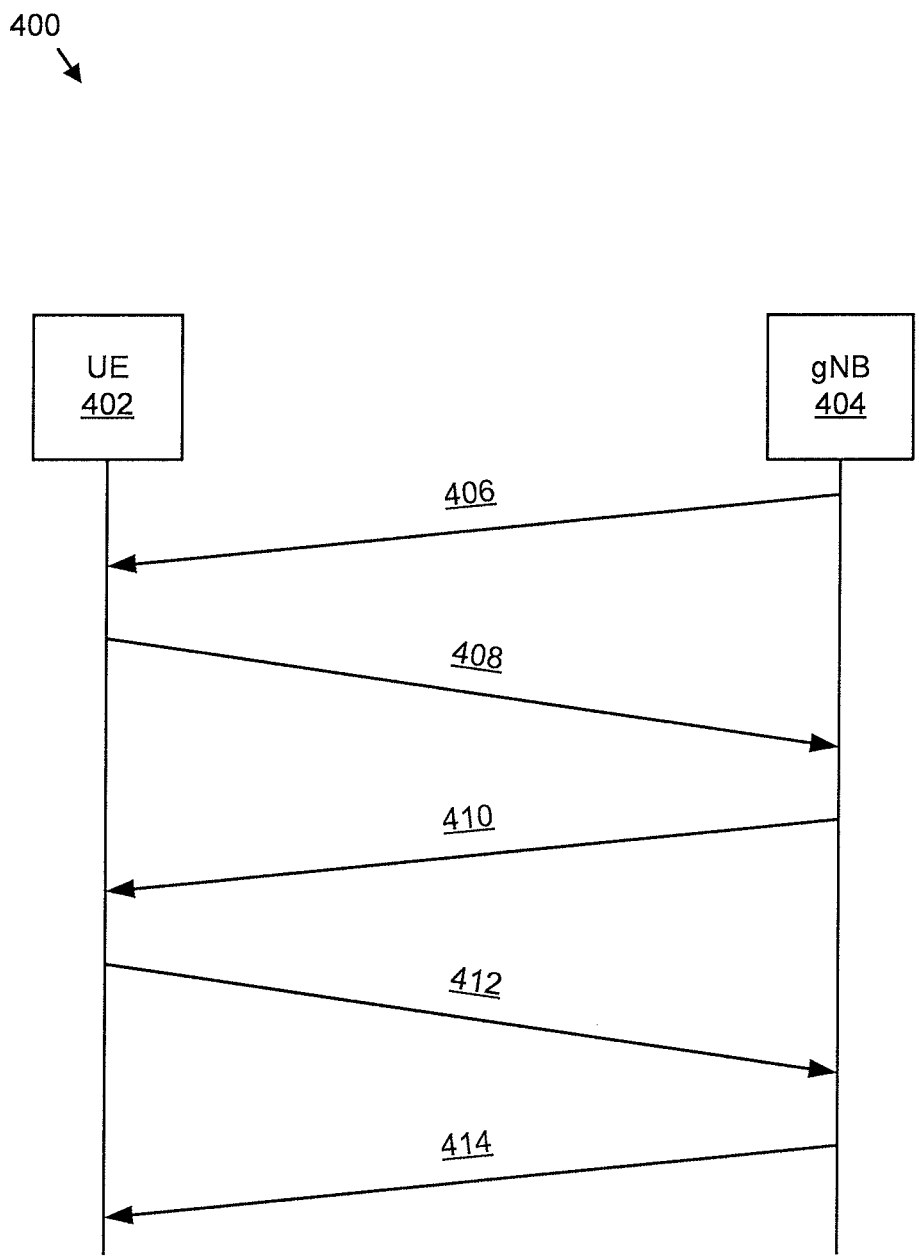
FIG. 4 illustrates one embodiment of communications using resource configuration priority levels.

FIG. 4 illustrates one embodiment of communications 400 using resource configuration priority levels. Specifically, communications 400 between a UE 402 and a gNB 404 are illustrated. The communications 400 may facilitate using resource configuration priority levels for communication between the UE 402 and the gNB 404.

A first communication 406 may include a message transmitted from the gNB 404 to the UE 402. The first communication 406 may include random access resource information indicating multiple random access resource configurations having different priority levels. In some embodiments, the first communication 406 may include information indicating multiple PRACH resource configurations. In various embodiments, the first communication 406 may be used to configure multiple priority levels of PRACH resources. The first communication 406 may be communicated in a SIB and/or MIB. Each random access resource configuration may include a random access resource priority level (e.g., first priority, second priority, main priority, high priority, medium priority, low priority, etc.), a preamble sequence set (e.g., length of 71 Zadoff-Chu ("ZC") sequence, length of 141 ZC sequence), a subcarrier spacing (e.g., 1.25 KHz, 5 KHz, etc.), a frequency domain interval (e.g., 72 subcarrier, 144 subcarrier, etc.), a time domain interval (e.g., 1 ms, 0.25 ms, etc.), a period, a time offset (e.g., symbol number), and/or a frequency offset (e.g., PRB number). In some embodiments, the priority level may be first, high, and/or main if it is the most important priority level (e.g., used for communications that are important, critical, extreme, etc.). In various embodiments, the priority level may be second, medium, and/or low if it is not the most important priority level (e.g., used for communications that are less important than a first, high, and/or main priority level, normal communication). In certain embodiments, a communication that is an extreme communication may only be transmitted on a resource with the most important priority level, and a communication that is a normal communication may be transmitted on any available resource regardless of priority level. The UE 402 may select one random access resource configuration from the multiple random access resource configurations.

The multiple priority levels of PRACH resource configurations may be used to facilitate UEs operating using extreme coverage from interfering with other UE RACH transmission. In various embodiments, a PRACH resource may be configured as a resource: used by an MTC UE in normal coverage (e.g., communication with no or a small number of repetitions); or used by an MTC UE in normal coverage and extreme converge (e.g., communication with a large number of repetitions). In some embodiments, a PRACH resource may be configured as: used by mMTC only; used by URLLC only; and/or shared by eMBB and URLLC.

The PRACH resources may be independently configured or configured together. For example, in one embodiment, only a first PRACH resource may be configured and a second PRACH resource may be derived from the first PRACH resource (e.g., using some predefined information such as time offset and/or frequency offset).

In certain embodiments, the gNB 404 may transmit a partial or the entire PRACH resource configuration information to particular UE. In one embodiment, the gNB 404 may transmit resource configuration information to mMTC UEs, URLLC UEs, and/or eMBB UEs separately. In another embodiment, the gNB 404 may transmit resource configuration information to all types of UEs simultaneously.

In some embodiments, the UE 402 may receive partial or the entire PRACH resource configuration and select one of the PRACH resources to transmit the preamble on. The selected PRACH resource may be based on the UE type and a current PRACH load status. In one embodiment, if an mMTC UE is in extreme coverage, the UE 402 may select the resource used by a UE in normal coverage and extreme coverage in order to avoid occupying the PRACH resource for a long period and interfering with other UEs in normal coverage. In some embodiments, if an mMTC UE is in normal coverage, the UE 402 may select the resource used by a UE in normal coverage and/or resources used by a UE in normal coverage and extreme coverage. In various embodiments, a URLLC UE may select a resource only for URLLR first to facilitate performance and latency.

In response to the first communication 406, a second communication 408 may include a message transmitted from the UE 402 to the gNB 404. The second communication 408 may include a preamble transmission (e.g., MSG 1). In response to the second communication 408, a third communication 410 may include an RAR (e.g., MSG 2) transmitted from the gNB 404 to the UE 402. In response to the third communication 410, a fourth communication 412 may include a connection request (e.g., MSG 3) transmitted from the UE 402 to the gNB 404. In response to the fourth communication 412, a fifth communication 414 may include a contention resolution message (e.g., MSG 4) transmitted from the gNB 404 to the UE 402.

Figure 5:
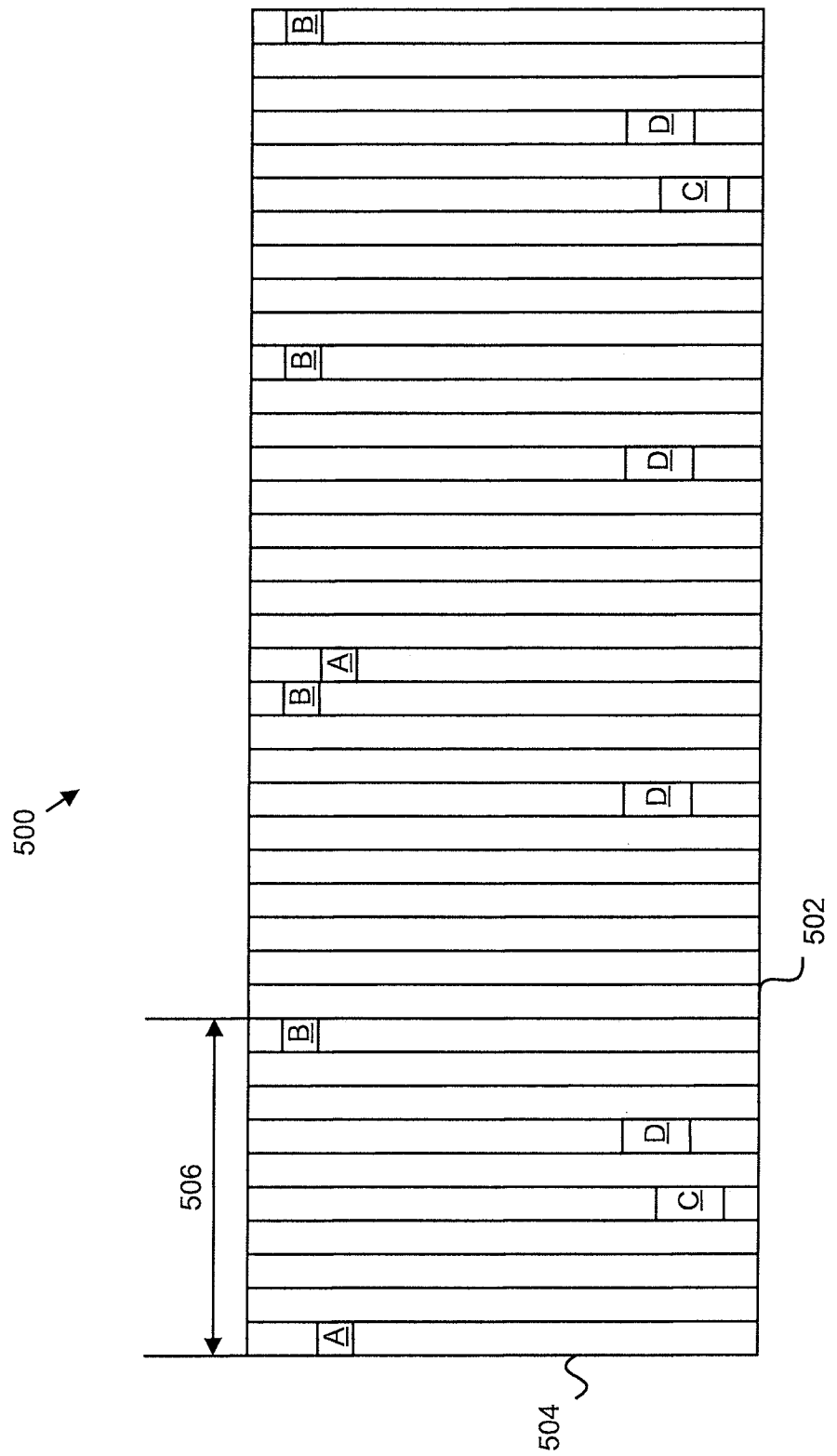
FIG. 5 illustrates a block diagram of resource allocations using resource configuration priority levels.

FIG. 5 illustrates a block diagram of resource allocations 500 using resource configuration priority levels. The resource allocations 500 are illustrated over a time 502 (e.g., x-axis) and frequency 504 (e.g., y-axis). Moreover, the resource allocations 500 are divided into subframes 506. Moreover, a first resource allocation A includes a first PRACH resource that may be used by mMTC in normal coverage only. The first PRACH resource may be high priority, have a subcarrier spacing of 1.25 KHz, have a time domain interval of 1 ms, and have a frequency domain interval of 72 subcarriers. A second resource allocation B includes a second PRACH resource that may be shared by mMTC in normal and extreme coverage. The second PRACH resource may be a low priority, have a subcarrier spacing of 1.25 KHz, have a time domain interval of 1 ms, and have a frequency domain interval of 72 subcarriers.

Further, a third resource allocation C includes a third PRACH resource that may be used by URLLC only. The third PRACH resource may be a high priority, have a subcarrier spacing of 5 KHz, have a time domain interval of 0.25 ms, and have a frequency domain interval of 144 subcarriers. A fourth resource allocation D includes a fourth PRACH resource that may be used by shared by eMBB and URLLC. The fourth PRACH resource may be a low priority, have a subcarrier spacing of 5 KHz, have a time domain interval of 0.25 ms, and have a frequency domain interval of 144 subcarriers.

In one example, the gNB 404 may configure multiple priority levels of PRACH resources and transmit these PRACH resources to the UE 402 (e.g., an MTC UE) using narrowband SIB in the first communication 406 of FIG. 4. In such an example, the multiple priority levels may include the second resource allocation B as a main PRACH resource set and the first resource allocation A as a second PRACH resource set. The first and second resource allocations A and B may both use the same preamble sequence, but may use different resources to transmit the preamble sequence. In response to the first communication 406, the UE 402 may, in extreme coverage, select one PRACH resource from the second PRACH resource set and transmit the preamble in the second communication 408 of FIG. 4. By using the second PRACH resource set, the UE 402 may avoid interfering with a UE operating in normal coverage. In response to the first communication 406, the UE 402 may, in normal coverage, select one PRACH resource from either the first PRACH resource set or the second PRACH resource set and transmit the preamble in the second communication 408 of FIG. 4. Being able to transmit using either the first PRACH resource set or the second PRACH resource set may facilitate meeting a latency requirement.

In another example, the gNB 404 may configure multiple priority levels of PRACH resources and transmit these PRACH resources to the UE 402 (e.g., a URLLC UE) using wideband SIB in the first communication 406 of FIG. 4. In such an example, the multiple priority levels may include the fourth resource allocation D as a main PRACH resource set and the third resource allocation C as a second PRACH resource set. The first and second resource allocations A and B may both use the same preamble sequence, but may use different resources to transmit the preamble sequence. In response to the first communication 406, the UE 402 may, select one PRACH resource from the second PRACH resource set and transmit the preamble in the second communication 408 of FIG. 4. By using the second PRACH resource set, the UE 402 may use a unique resource to facilitate access quality and wideband (e.g., short duration) preamble transmission to support dynamic TDD and/or a self-contained structure. In response to the first communication 406, if the UE 402 fails to access the network using a resource from the second PRACH resource set, select one PRACH resource from either the first PRACH resource set or the second PRACH resource set (e.g., depending on which resource is next) and transmit the preamble in the second communication 408 of FIG. 4. Being able to transmit using either the first PRACH resource set or the second PRACH resource set may facilitate meeting a latency requirement.

By having a priority level tied to a PRACH resource set, the gNB 404 may facilitate flexibly scheduling different services under diverse scenarios, have full use of PRACH resources for different services by balancing a specific PRACH resource and sharing PRACH resources, facilitate meeting a quality and latency requirement for various configurations, avoid collision from other UEs, and/or facilitate access for high priority UEs.

Figure 6:
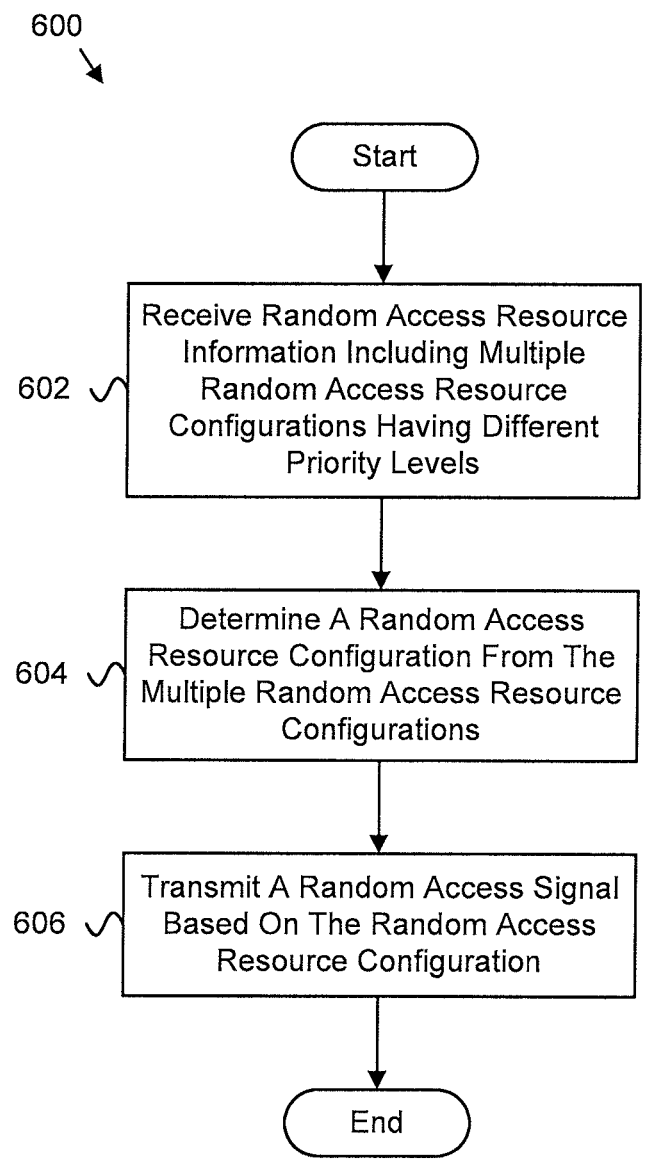
FIG. 6 is a schematic flow chart diagram illustrating one embodiment of a method for using resource configuration priority levels.

FIG. 6 is a schematic flow chart diagram illustrating one embodiment of a method 600 for using resource configuration priority levels. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 random access resource information indicating multiple random access resource configurations having different priority levels. The method 600 also includes determining 604 a random access resource configuration from the multiple random access resource configurations. In one embodiment, the method 600 includes transmitting 606 a random access signal based on the random access resource configuration.

In one embodiment, each random access resource configuration of the multiple random access resource configurations includes a random access resource priority level, a preamble sequence set, a subcarrier spacing, a frequency domain interval, a time domain interval, a period, a time offset, and/or a frequency offset. In some embodiments, each random access resource configuration of the multiple random access resource configurations includes a random access resource priority level. In various embodiments, each random access resource configuration of the multiple random access resource configurations includes a preamble sequence set. In a further embodiment, the receiver receives the random access resource information in a system information block and/or a master information block.

Figure 7:
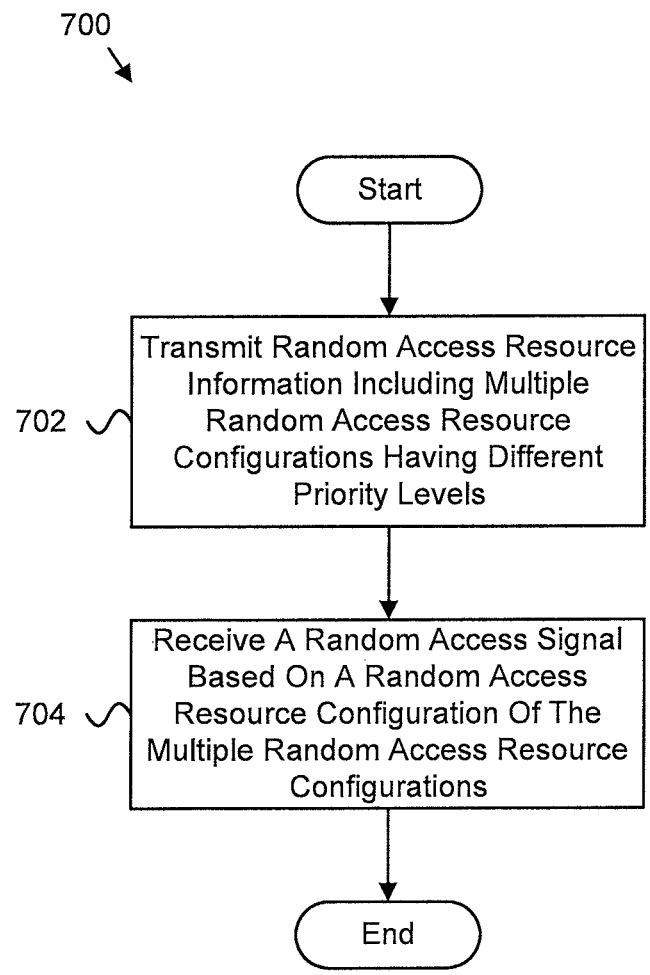
FIG. 7 is a schematic flow chart diagram illustrating another embodiment of a method for using resource configuration priority levels.

FIG. 7 is a schematic flow chart diagram illustrating one embodiment of a method 700 for using resource configuration priority levels. In some embodiments, the method 700 is performed by an apparatus, such as the base unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702 random access resource information indicating multiple random access resource configurations having different priority levels. The method 700 also includes receiving 704 a random access signal based on a random access resource configuration of the multiple random access resource configurations.

In one embodiment, each random access resource configuration of the multiple random access resource configurations includes a random access resource priority level, a preamble sequence set, a subcarrier spacing, a frequency domain interval, a time domain interval, a period, a time offset, and/or a frequency offset. In some embodiments, each random access resource configuration of the multiple random access resource configurations includes a random access resource priority level. In various embodiments, each random access resource configuration of the multiple random access resource configurations includes a preamble sequence set. In a further embodiment, the receiver receives the random access resource information in a system information block and/or a master information block.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a receiver that receives random access resource information indicating a plurality of random access resource configurations and corresponding priority levels for the plurality of random access resource configurations via one system information block, wherein each random access resource configuration of the plurality of random access resource configurations comprises a random access resource priority level, a subcarrier spacing of a preamble, a frequency domain interval of the random access resource, and a time domain interval of the random access resource, wherein the random access resource priority level of each random access resource configuration is selected from a group comprising: a first priority, a second priority, a main priority, a high priority, a medium priority, and a low priority;
   a processor that determines a random access resource configuration from the plurality of random access resource configurations based on a quality requirement and a latency requirement for a random access signal; and
   a transmitter that transmits the random access signal using the random access resource configuration.

2. The apparatus of claim 1, wherein each random access resource configuration of the plurality of random access resource configurations comprises a preamble sequence set, a period, a time offset, a frequency offset, or some combination thereof.

3. The apparatus of claim 1, wherein each random access resource configuration of the plurality of random access resource configurations comprises a preamble sequence set.

4. A method comprising:
   receiving random access resource information indicating a plurality of random access resource configurations and corresponding priority levels for the plurality of random access resource configurations via one system information block, wherein each random access resource configuration of the plurality of random access resource configurations comprises a random access resource priority level, a subcarrier spacing of a preamble, a frequency domain interval of the random access resource, and a time domain interval of the random access resource, wherein the random access resource priority level of each random access resource configuration is selected from a group comprising: a first priority, a second priority, a main priority, a high priority, a medium priority, and a low priority;
   determining a random access resource configuration from the plurality of random access resource configurations based on a quality requirement and a latency requirement for a random access signal; and
   transmitting the random access signal using the random access resource configuration.

5. The method of claim 4, wherein each random access resource configuration of the plurality of random access resource configurations comprises a preamble sequence set, a period, a time offset, a frequency offset, or some combination thereof.

6. The method of claim 4, wherein each random access resource configuration of the plurality of random access resource configurations comprises a preamble sequence set.

7. An apparatus comprising:
- a transmitter that transmits random access resource information indicating a plurality of random access resource configurations and corresponding priority levels for the plurality of random access resource configurations via at least one system information block, wherein each random access resource configuration of the plurality of random access resource configurations comprises a random access resource priority level, a subcarrier spacing of a preamble, a frequency domain interval of the random access resource, and a time domain interval of the random access resource, wherein the random access resource priority level of each random access resource configuration is selected from a group comprising: a first priority, a second priority, a main priority, a high priority, a medium priority, and a low priority; and
- a receiver that receives a random access signal using a random access resource configuration of the plurality of random access resource configurations, wherein the random access resource configuration is based on a quality requirement and a latency requirement for the random access signal.

8. The apparatus of claim 7, wherein each random access resource configuration of the plurality of random access resource configurations comprises a preamble sequence set, a period, a time offset, a frequency offset, or some combination thereof.

9. The apparatus of claim 7, wherein each random access resource configuration of the plurality of random access resource configurations comprises a preamble sequence set.

10. A method comprising:
- transmitting random access resource information indicating a plurality of random access resource configurations and corresponding priority levels for the plurality of random access resource configurations via at least one system information block, wherein each random access resource configuration of the plurality of random access resource configurations comprises a random access resource priority level, a subcarrier spacing of a preamble, a frequency domain interval of the random access resource, and a time domain interval of the random access resource, wherein the random access resource priority level of each random access resource configuration is selected from a group comprising: a first priority, a second priority, a main priority, a high priority, a medium priority, and a low priority; and
- receiving a random access signal using a random access resource configuration of the plurality of random access resource configurations, wherein the random access resource configuration is based on a quality requirement and a latency requirement for the random access signal.

11. The method of claim 10, wherein each random access resource configuration of the plurality of random access resource configurations comprises a preamble sequence set, a period, a time offset, a frequency offset, or some combination thereof.

12. The method of claim 10, wherein each random access resource configuration of the plurality of random access resource configurations comprises a preamble sequence set.

* * * * *